No. 629,859. Patented Aug. 1, 1899.
W. F. HOYT.
GRAIN DRILL.
(Application filed Apr. 21, 1899.)
(No Model.)
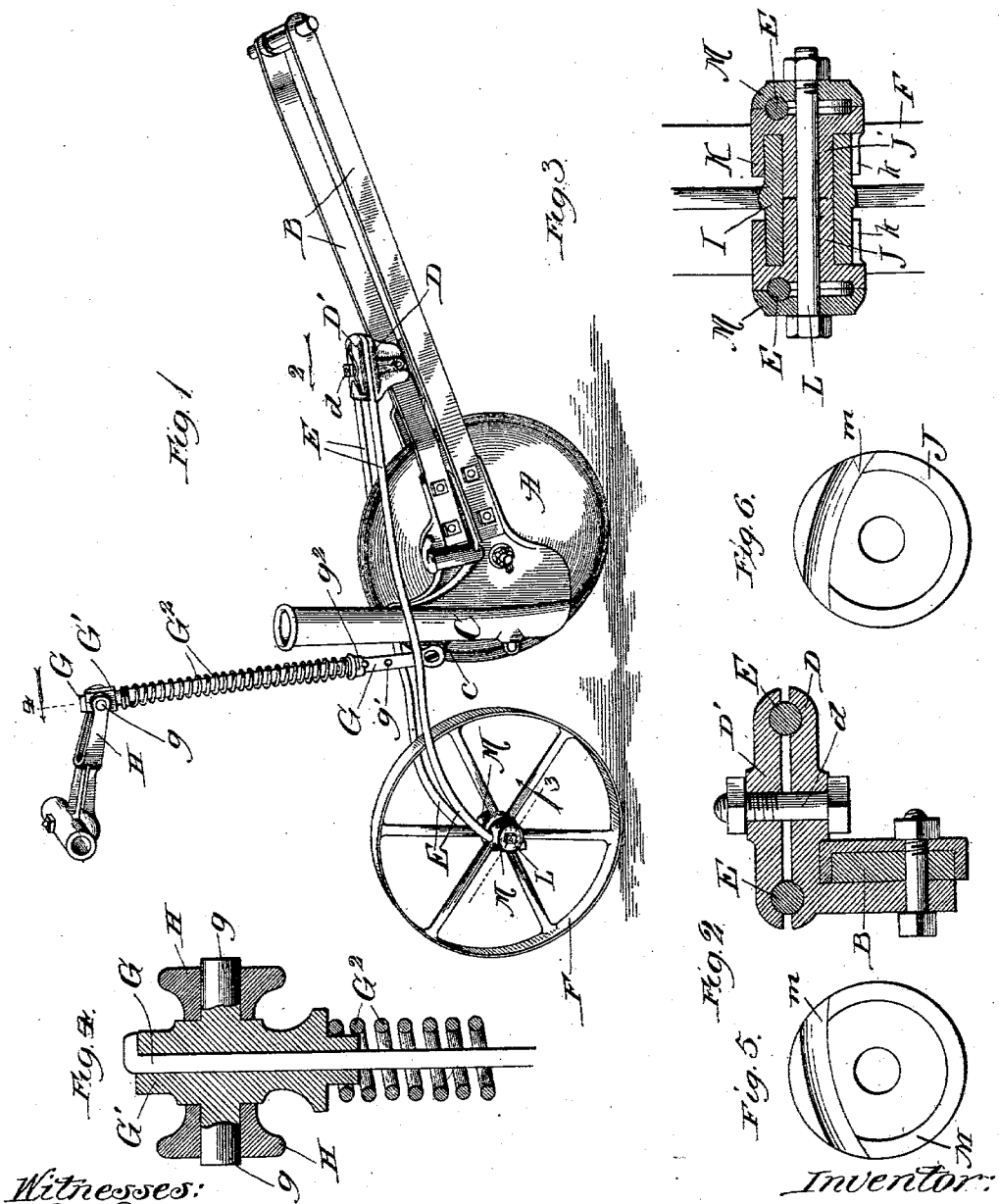
Witnesses:
Chas E Gaylord,
Lute D. Slter.
Inventor:
Will F. Hoyt,
By Banning & Banning & Sheridan,
Att'ys.

UNITED STATES PATENT OFFICE.

WILL F. HOYT, OF DOWAGIAC, MICHIGAN.

GRAIN-DRILL.

SPECIFICATION forming part of Letters Patent No. 629,859, dated August 1, 1899.

Application filed April 21, 1899. Serial No. 713,849. (No model.)

*To all whom it may concern:*

Be it known that I, WILL F. HOYT, a citizen of the United States, residing at Dowagiac, in the county of Cass and State of Michigan, have invented certain new and useful Improvements in Grain-Drills, of which the following is a specification.

My invention has more particular reference to disk grain-drills, and relates more particularly to the means for regulating the pressure of the press-wheel which follows the disk to close the furrow in which the grain has been deposited; and my invention consists of the features and details of construction hereinafter described and claimed.

In the drawings, Figure 1 represents a side elevation showing my improvement. Fig. 2 is a front sectional elevation taken in the line 2 of Fig. 1, looking in the direction of the arrow. Fig. 3 is a transverse section of the hub of the press-wheel and associated parts, taken in the line 3 of Fig. 1, looking in the direction of the arrow. Fig. 4 is a detail view of a connection hereinafter described, and Figs. 5 and 6 illustrate details hereinafter described.

In making my improvement in grain-drills I mount a disk A in main draft-bars B, which may be done in the usual way. I make a grain-spout C, which occupies the usual position with reference to the disk, so as to deposit the grain in the furrow made or opened by the disk. I provide this grain-spout with a rearwardly-projecting lug $c$, for a purpose hereinafter explained. I mount in any convenient and secure way on the main draft-bars a plate D, provided with bent grooves or channels in its upper face to receive correspondingly-bent ends of the spring draft-rods E, as will be readily understood from an examination of Fig. 1. To hold the ends of the spring draft-rods in place securely and rigidly, I employ a cap D', provided with correspondingly-shaped grooves in its under face, so that when the plate and the cap are arranged together and fastened by a bolt $d$, as shown in Fig. 2, the ends of the spring draft-rods will be held in rigid or fixed relation to the main draft-bars, so that as means are employed to sink the disk more or less deeply in the ground the rear ends of the spring draft-rods will be correspondingly more or less depressed. I mount a press-wheel F in the rear ends of the spring draft-rods, so that it will follow the disk and close the furrow and press the soil down upon and around the grain deposited in the furrow. In order that this may be properly done, it is important that the press-wheel be either sufficiently heavy to press the soil closely and firmly into the furrow and around and upon the grain or that means be employed to give it the requisite pressure upon the soil. In order to assist in securing this latter result, I pivotally attach a rod G to the rearwardly-extending lug $c$ on the grain-spout and carry it up through a block G', pivotally attached through the studs or pintles $g$ to a part H of the frame of the grain-drill. The lower end of the rod G is provided with a number of perforations $g'$, through which a pin may be inserted to hold a collar $g^2$ at a desired position up or down. Between this collar and the upper end of the rod is arranged a coiled spring $G^2$, so that by moving the collar up and down and fastening it in different positions by the pin the tension of the spring may be regulated, as may be desired, so as to increase or decrease the pressure on the disk. As the pressure is increased the disk will be forced more deeply into the soil, and the pressure exerted on the disk through the spring $G^2$ will be communicated to the press-wheel through means of the spring draft-rods, which, as already explained, are rigidly connected at their front ends to the holding-plate mounted on the main draft-bars. In like manner as the pressure is decreased through means of the spring $G^2$ the press-wheel will be correspondingly relieved, so that it will bear with less pressure on the soil. The disk and press-wheels are permitted to rise and fall as they encounter hard clods, rocks, or other obstructions through the movement of the rod G, which is permitted to slide up through the block G', as may be necessary, though of course such upward movement will always be against the tension of the spring $G^2$, which as soon as the obstruction is passed will force the disk and press-wheel down again into their proper position.

I do not, however, depend entirely upon the means above described for regulating—increasing or decreasing—the pressure of the press-wheel on the ground, but in addition employ other means, which I will now describe.

I insert in the hub I of the press-wheel inner collars J and J', which are made of a size to properly fit the bore of the hub and which are intended to meet at the center of the hub, as illustrated in Fig. 3. These collars have circumferential inwardly-projecting flanges K, which surround and inclose the ends of the hub, except at the slots $k$, where the surface of the hub is exposed. A bore passes longitudinally through the collars to admit the insertion of a bolt L. Outer collars M, adapted to fit against the outer ends of the inner collars and provided with axial holes, are arranged to be held in place by the bolt L, as shown in Fig. 3. The outer face of the inner collars and the inner face of the outer collars are each provided with curved or inclined grooves $m$, adapted to receive the ends of the spring draft-rods E, as shown in Figs. 1 and 3. The spring draft-rods are curved, bent, or inclined at their rear portion, so that by loosening the nut on the bolt L the outer collars will be loosened, so that the ends of the spring draft-rods will cease to be clamped, when the press-wheel can be adjusted or moved in a vertical plane up or down on the curve or incline and fastened in a new position of adjustment by again tightening the nut on the bolt. Of course as the press-wheel is vertically adjusted up or down on the curved or inclined ends of the spring draft-rods its pressure on the ground will be regulated and adjusted to suit the particular work being done. In this way the position, and consequently the pressure, of the press-wheel may be regulated at any time without changing the pressure exerted by the spring $G^2$ on the disk-wheel and transmitted through the spring draft-rods E to the press-wheel. By the employment of both means, however, any requisite amount of pressure on the press-wheel can always be secured.

Of course it will be understood that any desired implement, as well as a press-wheel, may be mounted on the curved or inclined ends of the draft-rods and adjusted up and down the curve or incline, so that I do not desire in all cases to confine myself to a literal press-wheel.

What I regard as new, and desire to secure by Letters Patent, is—

1. In a grain-drill, the combination of spring draft-rods rigidly held or secured at their front ends and curved or inclined at their rear ends, and an implement mounted on the curved or inclined ends of the draft-rods and adjustable up and down the curve or incline, substantially as described.

2. In a grain-drill, the combination of spring draft-rods, and a press-wheel adjustably mounted on the rear ends thereof so that it may be moved in a vertical plane thereon, substantially as described.

3. In a grain-drill, the combination of spring draft-rods curved or inclined at their rear ends, a press-wheel mounted thereon, and inner and outer collars at each side of the press-wheel between which the curved or inclined ends of the spring draft-rods are held and clamped, substantially as described.

4. In a grain-drill, the combination of spring draft-rods curved or inclined at their rear ends, a press-wheel mounted thereon, inner collars at each side of the press-wheel provided with hubs extending into the axial opening of the press-wheel, outer collars between which and the inner collars the curved or inclined ends of the spring draft-rods are held and clamped, and bolt-and-nut mechanism to hold the inner and outer collars in operative engagement, substantially as described.

5. In a grain-drill, the combination of spring draft-rods curved or inclined at their rear ends, a press-wheel mounted thereon, inner collars at each side of the press-wheel provided with hubs extending into the axial opening of the press-wheel and with eccentric grooves on their outer faces, outer collars provided with eccentric grooves on their inner faces in which eccentric grooves of the inner and outer collars the curved or inclined ends of the spring draft-rods are held and clamped, and bolt-and-nut mechanism to hold the inner and outer collars in operative engagement, substantially as described.

6. In a grain-drill, the combination of main draft-bars, a disk mounted therein, a feed-spout provided with a rearwardly-extending lug, spring draft-rods rigidly supported at their front ends on the main draft-bars and curved or inclined at their rear ends, a press-wheel mounted thereon and adjustable up and down the curve or incline, a rod pivoted at its lower end to the rearwardly-extending lug on the grain-spout and extending up to the frame of the machine and having sliding connection at its upper end therewith, a coiled spring surrounding the rod, and means for adjusting the tension of the spring, substantially as described.

7. In a grain-drill, the combination of main draft-bars, a disk mounted therein, a feed-spout provided with a rearwardly-extending lug, spring draft-rods rigidly supported at their front ends on the main draft-bars and curved or inclined at their rear ends, a press-wheel mounted thereon and adjustable up and down the curve or incline, a rod pivoted at its lower end to the rearwardly-extending lug of the grain-spout and extending up a desired distance, a block pivoted to the frame of the machine and provided with a hole in which the upper end of the rod is slidingly received, a coiled spring surrounding the rod below the block, and means for adjusting the tension of the spring, substantially as described.

WILL F. HOYT.

Witnesses:
C. L. FOWLE,
F. W. JONES.